US010169192B2

(12) United States Patent
Boxall et al.

(10) Patent No.: US 10,169,192 B2
(45) Date of Patent: Jan. 1, 2019

(54) AUTOMATIC COLLECTION AND PRESENTATION OF RUNTIME DATA SEMANTICS

(71) Applicant: International Business Machines Corporation, Armonk, NY (US)

(72) Inventors: Alan S. Boxall, Markham (CA); Steven Cooper, Pickering (CA); Tao Guan, Toronto (CA); Trong Truong, Markham (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/937,940

(22) Filed: Nov. 11, 2015

(65) Prior Publication Data
US 2017/0132109 A1    May 11, 2017

(51) Int. Cl.
*G06F 11/36* (2006.01)

(52) U.S. Cl.
CPC .......... *G06F 11/362* (2013.01); *G06F 11/366* (2013.01); *G06F 11/3636* (2013.01)

(58) Field of Classification Search
CPC ........................ G06F 11/362; G06F 11/3636
See application file for complete search history.

(56) References Cited

U.S. PATENT DOCUMENTS

| 5,764,989 | A  | * | 6/1998  | Gustafsson ............... G06F 8/48 714/E11.21 |
| 5,881,288 | A  | * | 3/1999  | Sumi ................... G06F 11/3628 717/113 |
| 7,383,538 | B2 | * | 6/2008  | Bates .................. G06F 11/3636 714/39 |
| 7,917,894 | B2 |   | 3/2011  | Chen et al. |
| 8,087,002 | B2 |   | 12/2011 | Fjeldstad et al. |
| 8,621,435 | B2 |   | 12/2013 | Aharoni et al. |
| 8,776,025 | B2 |   | 7/2014  | Wisniewski |
| 8,930,879 | B2 |   | 1/2015  | Fernandez et al. |
| 8,997,049 | B1 |   | 3/2015  | Melnikov et al. |
| 9,015,664 | B2 |   | 4/2015  | Supplisson et al. |
| 2003/0221185 | A1 | * | 11/2003 | Bates .................. G06F 11/3664 717/125 |
| 2007/0028218 | A1 | * | 2/2007  | Masser ............... G06F 11/3636 717/124 |
| 2007/0234293 | A1 |   | 10/2007 | Noller et al. |

(Continued)

OTHER PUBLICATIONS

Rothlisberger et al., "Exploiting Runtime Information in the IDE*", ICPC 2008 (International Conference on Program Comprehension), 2008, pp. 1-10.

(Continued)

*Primary Examiner* — Chat C Do
*Assistant Examiner* — Douglas M Slachta
(74) *Attorney, Agent, or Firm* — Gilbert Harmon, Jr.

(57) ABSTRACT

An approach for collection and presentation of runtime data semantics. At least one of code-coverage history, system runtime history and code version information are received. An inspection line of code or variable(s) are received and runtime data semantics is retrieved from at least one of code-coverage history, system runtime history and code version information. The runtime data semantics are filtered based on the inspection line of code and/or variable(s) and are output.

17 Claims, 4 Drawing Sheets

(56) References Cited

U.S. PATENT DOCUMENTS

| | | | |
|---|---|---|---|
| 2011/0072418 A1* | 3/2011 | Kalamegham | G06F 11/3636 |
| | | | 717/128 |
| 2011/0173693 A1 | 7/2011 | Wysopal et al. | |
| 2011/0283260 A1 | 11/2011 | Bucuvalas | |
| 2011/0289357 A1* | 11/2011 | Shiina | G06F 11/3636 |
| | | | 714/38.1 |
| 2011/0321007 A1* | 12/2011 | Marum | G06F 8/65 |
| | | | 717/113 |
| 2012/0151451 A1* | 6/2012 | Lindahl | G06F 11/3636 |
| | | | 717/128 |
| 2012/0278790 A1* | 11/2012 | Bates | G06F 11/3636 |
| | | | 717/125 |
| 2013/0117730 A1* | 5/2013 | Wisniewski | G06F 11/3664 |
| | | | 717/125 |
| 2014/0282388 A1* | 9/2014 | Malkin | G06F 11/3636 |
| | | | 717/113 |

OTHER PUBLICATIONS

"Parasoft C/C++test™", Data Sheet, © Parasoft Corporation, printed Jul. 24, 2015, pp. 1-4.

Boxall et al., "Automatic Collection and Presentation of Runtime Data Semantics", U.S. Appl. No. 15/007,352, filed Jan. 27, 2015, 24 pages.

IBM Appendix P, patents or patent applications treated as related, Jan. 27, 2015, 2 pages.

* cited by examiner

AUTOMATIC COLLECTION AND PRESENTATION OF RUNTIME DATA SEMANTICS

BACKGROUND OF THE INVENTION

The present invention relates generally to the field of software development debugging, and more particularly to collection of data semantics for software defect analysis.

Debugging is the process of finding and resolving bugs or defects that prevent correct operation of computer software or a system. Debugging can be a complex process as interrelated function change in one area can cause bugs in another. A programmer can use a debugger tool as a means of examining program function to discover failure points in operation. A debugger tool provides a programmer with a way of analyzing defective program code to uncover clues about the cause of errant operation. The success of investigating and resolving software bugs depends on the extent of information a debugger can collect and provide.

SUMMARY

As disclosed herein, a method for collection and presentation of runtime data semantics, the method comprising: receiving at least one of a one or more code-coverage history, a one or more system runtime history and a one or more code version information; responsive to receiving at least one of an inspection line of code and an inspection variable, retrieving the runtime data semantics comprising at least one of the one or more code-coverage history, the one or more system runtime history and the one or more code version information wherein the runtime data semantics are filtered based on at least one of the inspection line of code and the inspection variable and outputting the runtime data semantics. A computer system and a computer program product corresponding to the above method are also disclosed herein.

DETAILED DESCRIPTION

Embodiments of the present invention provide systems, methods and computer program products for enriching debugger data with semantics (usage context) by providing code-coverage data for a variable being inspected. Code-coverage data is a record of software product variable values, branches followed, functions and/or program methods accessed, etc., during the operation of software product. Code-coverage provides a measure of the effectiveness of tests conducted to exercise a software product. In addition to code-coverage data, system runtime data and version information are provided to enhance defect investigation in debugger tools. System runtime data comprises, but is not limited to, memory mapping of program variables and objects allocated by a computer system during the operation of a software program. Version information is revision data related to source code that is maintained as part of the development of a software product. The approach provided, delivers a history of variable values, system state and version history to extend contextual debug information. The runtime and version history are defined as runtime data semantics and are used for defect analysis and problem resolution of a software product.

Embodiments of the present invention will now be described in detail with reference to the figures. It should be noted that references in the specification to "an exemplary embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic are described in connection with an embodiment, it is submitted that it is within the knowledge of one skilled in the art to affect such feature, structure, or characteristic in connection with other embodiments whether or not explicitly described.

Figure 1:
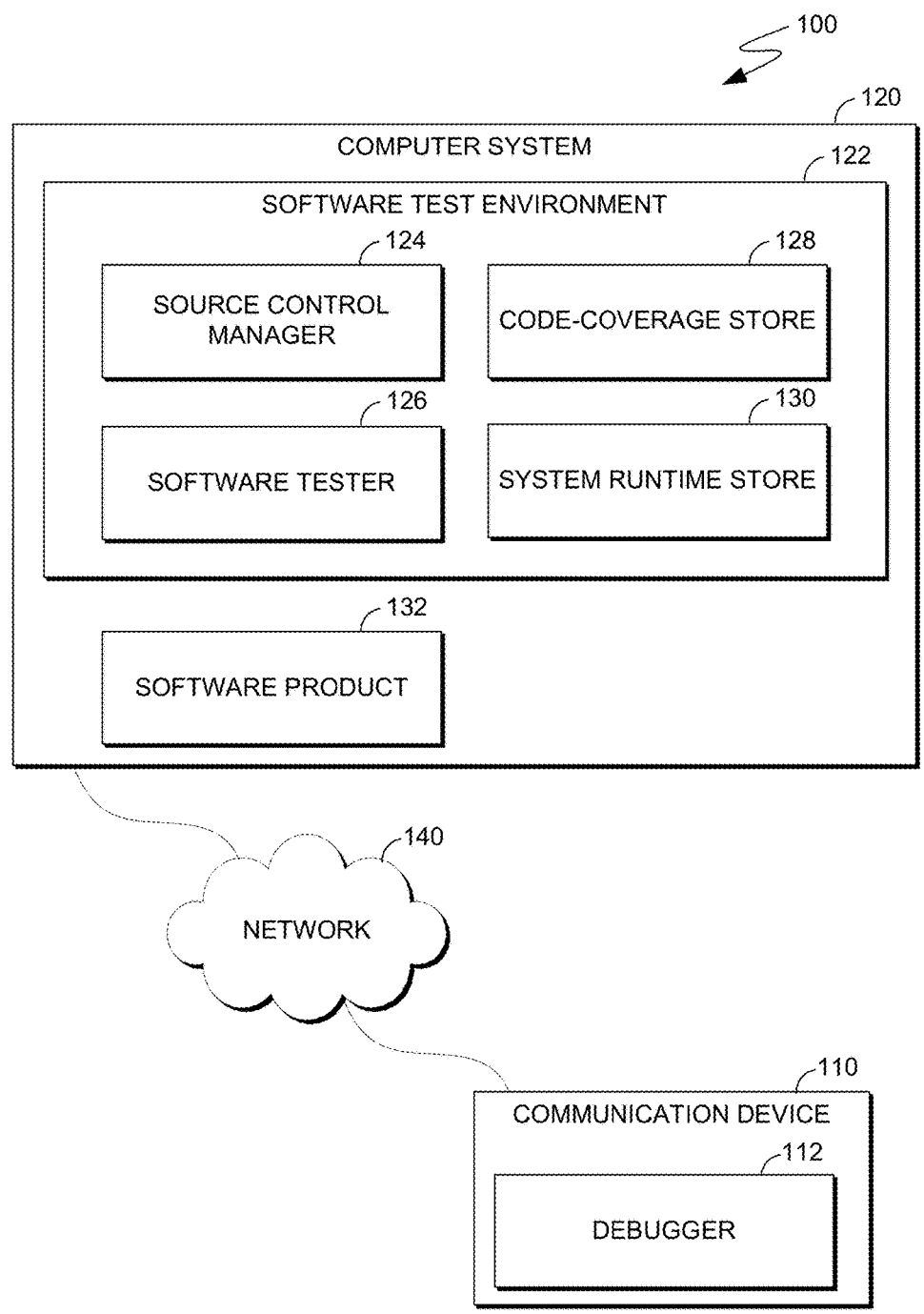
FIG. 1 is a functional block diagram illustrating a computing environment, in accordance with an embodiment of the present invention.

FIG. 1 is a functional block diagram of computing environment 100, in accordance with an embodiment of the present invention. Computing environment 100 comprises communication device 110, and computer system 120, interconnected via network 140. Communication device 110 and computer system 120 can be desktop computers, laptop computers, specialized computer servers, or the like. In certain embodiments, communication device 110 and computer system 120 represent computer systems utilizing clustered computers and components acting as a single pool of seamless resources via network 140. For example, such embodiments can be used in data center, cloud computing, storage area network (SAN), and network attached storage (NAS) applications. In general, communication device 110 and computer system 120 are representative of any electronic devices, or combination of electronic devices, capable of executing computer readable program instructions, as described in detail with regard to FIG. 4.

Network 140 can be, for example, a local area network (LAN), a wide area network (WAN) such as, the Internet, or a combination of the two, and include wired, wireless, or fiber optic connections. In general, network 140 can be any combination of connections and protocols that will support communications between communication device 110 and computer system 120, in accordance with an embodiment of the present invention.

In one embodiment of the present invention, computer system 120 comprises software test environment 122 and software product 132. Further, software test environment 122 comprises source control manager 124, software tester 126, code-coverage store 128 and system runtime store 130. Software test environment 122 comprises any combination of commercial or custom products associated with operating and maintaining software test environment 122.

Software product 132 comprises at least one of one or more software product 132 that is built, operated, tested and debugged using software test environment 122 and debugger 112.

In one embodiment of the present invention, source control manager 124 can be a plurality of source control managers 124 within software test environment 122. Source control manager 124 is a software development tool and source code repository used to manage software libraries, control software versioning and build (compile) of software product 132. When source control manager 124 completes build of software product 132, an executable copy of software product 132 is sent toward computer system 120.

In one embodiment of the present invention, software tester 126 can be a plurality of software testers 126 within software test environment 122. Software tester 126 performs automated and/or manual testing of software product 132 using predetermined test cases. Test results are stored as a history comprising, but not limited to, code-coverage data and system runtime data. It should be noted, one example method of automatic recording of code-coverage data is by using dynamic instrumentation when software product 132 is operated by software tester 126. The code-coverage data and system runtime data from the software test environment 122 test results are sent toward code-coverage store 128 and system runtime store 130 respectively. Software tester 126 provides data such as, but not limited to, memory address range values used by input, temporary and output variables during each test run of software product 132.

In one embodiment of the present invention, code-coverage store 128 can be a plurality of code-coverage stores 128 within software test environment 122. Code-coverage store 128 is a log of code-coverage data and comprises test results data such as, but not limited to, input variables, output variables, functions, program methods and logic branches used during one or more test runs of software product 132. A program method is a block of computer code that contains a series of program statements.

In one embodiment of the present invention, system runtime store 130 can be a plurality of system runtime stores 130 within software test environment 122. System runtime store 130 is a log of system runtime data and can be characterized as a process maps (procmap) history.

In this embodiment of the present invention, code-coverage store 128 and system runtime store 130 are separate, in other embodiments, code-coverage store 128 and system runtime store 130 can be integrated in software test environment 122.

Communication device 110 comprises debugger 112. In one embodiment of the present invention, debugger 112 can be a plurality of debuggers. Debugger 112 accesses system runtime store 130, code-coverage store 128 and source control manager 124 to provide associated historic information within a debug session. In one embodiment of the present invention, debugger 112 can be configured by the user (e.g., programmer) to identify the location of specific data from test runs in system runtime store 130, code-coverage store 128 and source control manager 124. In another embodiment of the present invention, debugger 112 can be configured to automatically select test result information based on factors such as, but not limited to, a quantity and a date range from predetermined locations in system runtime store 130, code-coverage store 128 and source control manager 124. Debugger 112 operates software product 132 in debug mode to step through operation of software product 132 with the purpose of identifying and resolving logic problems. Embodiments of the present invention provide historic code-coverage data, historic system runtime data and version information based on test run information from related system runtime store 130, code-coverage store 128 and source control manager 124 as each variable is inspected during debugger 112 session.

Figure 2:
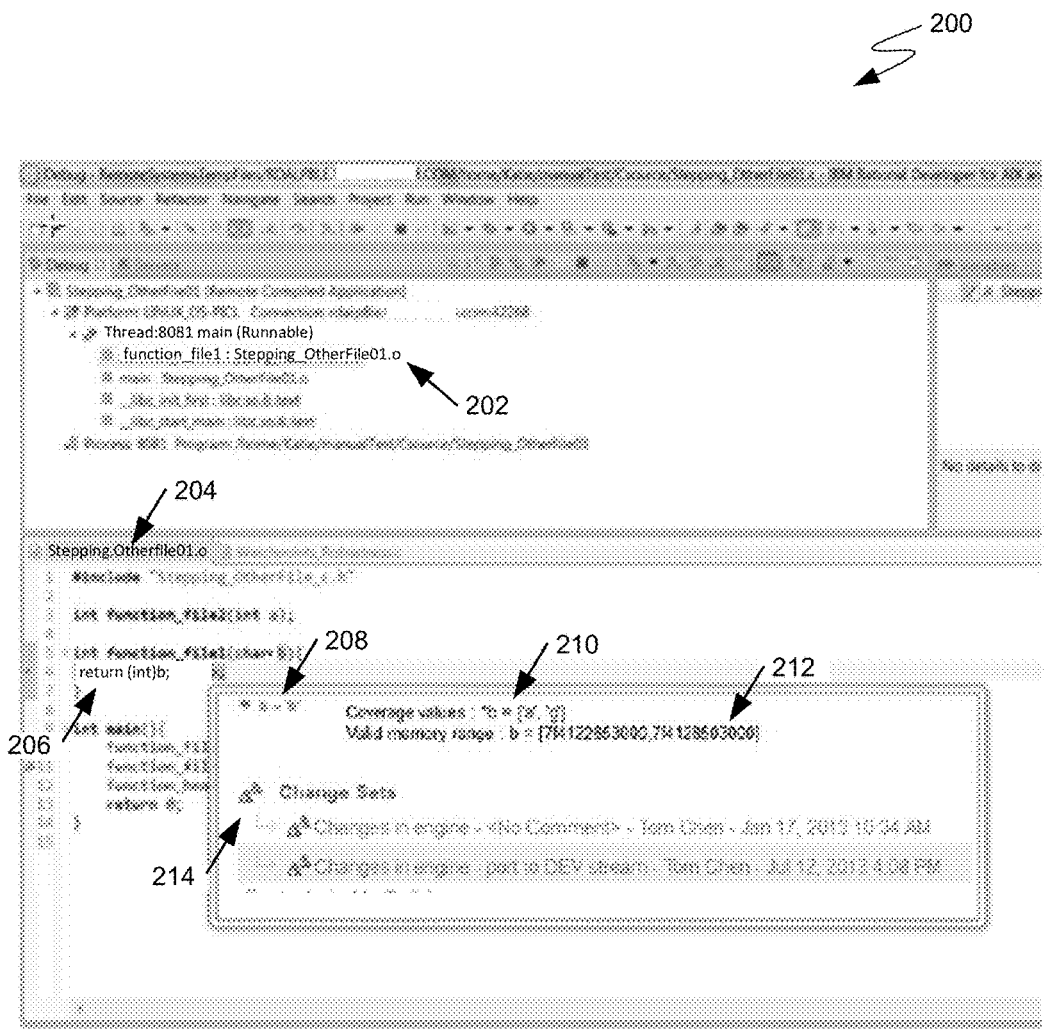
FIG. 2 depicts a sample debugger screen with data semantics, in accordance with an embodiment of the present invention.

FIG. 2 depicts a sample debugger screen with data semantics, in accordance with an embodiment of the present invention. The debugger screen 200 represents one embodiment of the present invention. Debugger 112 is an interactive tool and identifier 202 represents a function and/or program method being inspected. A user interaction (e.g., select text and mouse click) opened window identifier 204 of the function and/or program method "stepping.Otherfile01." The user inspects the variable identifier 206, integer 'b' by hovering over and/or selecting (e.g., with a computer mouse pointer) the variable to open an inspection window (identifier 208).

Identifier 208 inspection window contains an output of related information about the variable being inspected. Embodiment of the present invention display one or more of code-coverage data, system runtime data and source code version information.

Identifier 210 coverage values display variables affecting variable 'b'. The code-coverage data is retrieved from code-coverage store 128 that was generated by software tester 126 test runs. In the example, 'b' variable was affected by variable 'a' and 'g'. The identified code-coverage provides a clue to follow for further investigation. It should be noted, the example code-coverage history shown in brackets "[ ]" can comprise one or more code-coverage based on, but not limited to, the quantity of test runs in history and predetermined test range specified during a debugger session.

Identifier 212 valid memory address range displays memory address ranges used by variable 'b'. The historic variable memory address range(s) information are retrieved from one or more procmap(s) stored in system runtime store 130. It should be noted, the example memory address range shown in brackets "[ ]" can comprise one or more memory address ranges based on, but not limited to, the quantity of test runs in history and predetermined test range specified during a debugger session.

Identifier 214 change sets depicts source code version information from a source code repository in source control manager 124. It should be noted that version information is related to software product 132 during the build process by source control manager 124. The source code repository in source control manager 124 contains revision and/or version information and history for each line of code for software product 132.

Figure 3:
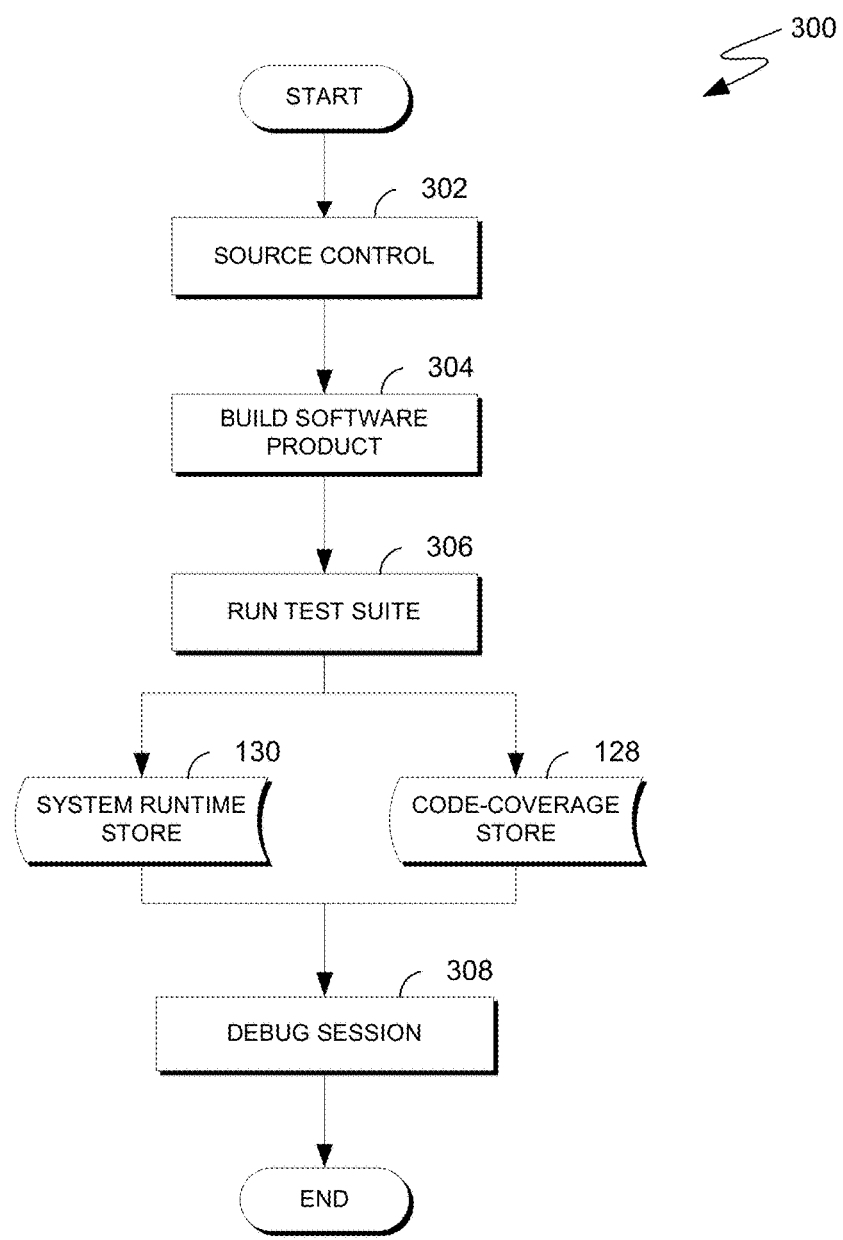
FIG. 3 is a flowchart depicting the collection and presentation of data semantics in accordance with an embodiment of the present invention.

FIG. 3 is a flowchart depicting the collection and presentation of data semantics, in accordance with an embodiment of the present invention. Step 302 source control in flow diagram 300 debugger semantics flow, manages the source code library where software version changes are tracked during the development of software product 132. Source control manager 124 is used in step 302 source control to predetermine the scope of code-coverage data to be collected. For example, the scope of collection of code-coverage data can vary based on a profile setting ranging from, but not limited to, source code line, function, program method, module and variable level logging.

Step 304 build software product compiles source code to create executable software product 132 in preparation for testing. It should be noted that embodiments of the present invention use source control manager 124 to perform step 304 build software product. During software product 132 build process dynamic instrumentation code-coverage can be established and the collection scope can be provided by a profile setting in source control manager 124.

Step 306 run test suite executes software product 132 through a series of predetermined test cases to assure versions of software product 132 operates as designed. During operation of step 306 run test suite, code-coverage data is sent toward code-coverage store 128 and procmap(s) are sent toward system runtime store 130.

Step 308 debug session provides the ability for a user to execute software product 132 by stepping through lines of code. Variables are selected for inspection in debugger 112 to determine potential causes of a program bug. When step 308 debug session is initiated, a user can specify the location of code-coverage data in code-coverage store 128 and system runtime data in system runtime store 130 associated to software product 132. Further, the location of source code repository in source control manager 124 can be specified by the user. As the user steps through software product 132 in debugger 112, the user can hover over and/or select (e.g., with a computer mouse pointer) a line of code and/or a plurality of variables in the line of code for inspection. Embodiments of the present invention responds to the line of code and/or the plurality of variables selected by opening an inspection window (identifier 208). The inspection window (identifier 208) queries related code-coverage store 128 and system runtime store 130 using the selected variable to retrieve code-coverage data and system runtime data respectively. Additionally, version information is retrieved based on the selected line of code where the selected line of code resides in source control manager 124 code repository. It should be noted that the inspection window (identifier 208) operation can be implemented by techniques such as, but not limited to, an Application Program Interface (API), a program module, integrated application, and stand-alone program. Embodiments of the present invention can provide profile settings for filtering of the range of information displayed in the inspection window. For example, the inspection window can display the most recent 3 test history code-coverage and/or the most recent 2 code versions affecting the source code line under inspection.

Figure 4:
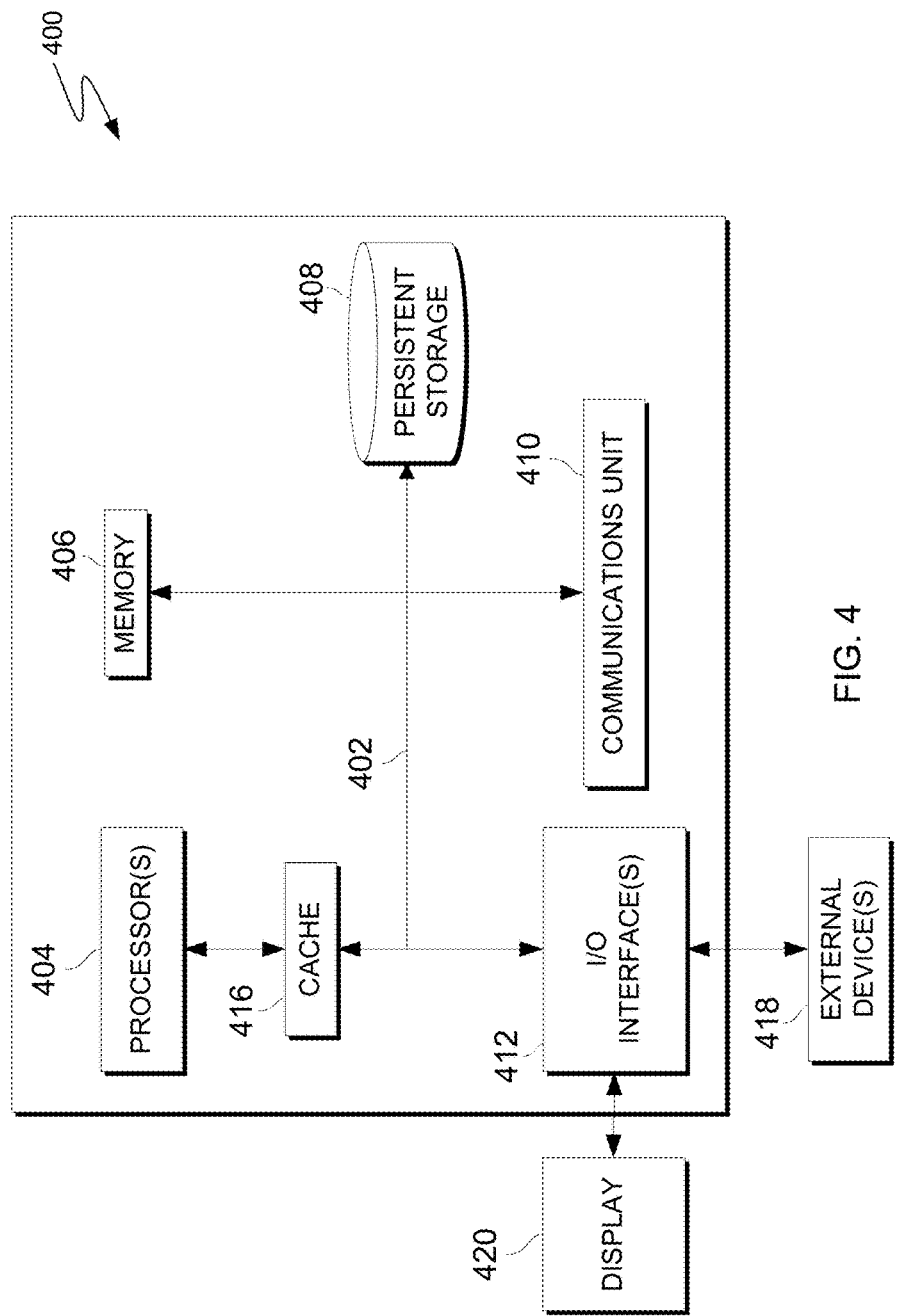
FIG. 4 depicts a block diagram of components of the server and/or the computing device, in accordance with an embodiment of the present invention.

FIG. 4 depicts a block diagram of components of communication device 110 and computer system 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses.

Computer system 400 includes processors 404, cache 416, memory 406, persistent storage 408, communications unit 410, input/output (I/O) interface(s) 412 and communications fabric 402. Communications fabric 402 provides communications between cache 416, memory 406, persistent storage 408, communications unit 410, and input/output (I/O) interface(s) 412. Communications fabric 402 can be implemented with any architecture designed for passing data and/or control information between processors (such as, microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of processors 404 by holding recently accessed data, and data near recently accessed data, from memory 406.

Program instructions and data used to practice embodiments of the present invention may be stored in persistent storage 408 and in memory 406 for execution by one or more of the respective processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices. In these examples, communications unit 410 includes one or more network interface cards. Communications unit 410 may provide communications through the use of either or both physical and wireless communications links. Program instructions and data used to practice embodiments of the present invention may be downloaded to persistent storage 408 through communications unit 410.

I/O interface(s) 412 allows for input and output of data with other devices that may be connected to each computer system. For example, I/O interface 412 may provide a connection to external devices 418 such as, a keyboard, keypad, a touch screen, and/or some other suitable input device. External devices 418 can also include portable computer readable storage media such as, for example, thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as, punchcards or raised structures in a groove having instructions recorded thereon, and any suitable combination of the foregoing. A computer readable storage medium, as used herein, is not to be construed as being transitory signals per se, such as, radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as, Smalltalk, C++ or the like, and conventional procedural programming languages, such as, the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for collection and presentation of runtime data semantics in a Software Test Environment, the method comprising:

receiving, by one or more computer processors, code-coverage history and system runtime history from a server connected by a network;

receiving, by the one or more computer processors, code version information from the server, wherein the code version information comprises revision data affecting each line of source code and wherein the code version information is based on a collection of change sets comprising a record of revisions from a plurality of source code builds in a source code repository, created during a software build process for the plurality of source code builds and maintained as part of the development of a software product;

responsive to receiving an inspection line of code and an inspection variable, retrieving, by the one or more computer processors, runtime data semantics from the server, comprising the code-coverage history, the system runtime history and the code version information, wherein the system runtime history comprises a current variable memory address range and a historic variable memory address range retrieved from process maps created by memory mapping program variables output during runtime from the plurality of test runs of the software product, and wherein the runtime data semantics are filtered based on the inspection line of code and the inspection variable;

outputting to a debugger, by the one or more computer processors, the runtime data semantics wherein the code-coverage history displays variables affected by the inspection variable value based on a plurality of test runs of the software product and the plurality of source code builds and wherein the code version information displays the record of revisions from the plurality of source code builds based on the inspection line of code and an inspection variable; and identifying and resolving, by the debugger, logic problems in the source code using the runtime data semantics.

2. The method of claim 1, wherein receiving the inspection line of code and the inspection variable comprises at least one of a mouse pointer hover and input device interaction in a debugger session.

3. The method of claim 1, wherein the code-coverage history comprises a current value and historic code-coverage data based on output from the plurality of test runs of the software product.

4. The method of claim 1, wherein the code version information comprises a current version and a history of code version information received from a collection of change sets, based on the plurality of source code builds.

5. The method of claim 1, wherein the code-coverage history further comprises output from the plurality of test runs of the software product and a predetermined scope of data collection.

6. The method of claim 1, further comprising:
filtering, by the one or more computer processors, the runtime data semantics output based on an output range limit associated with each of the code-coverage history, the system runtime history and the code version information.

7. A computer program product for collection and presentation of runtime data semantics in a Software Test Environment, the computer program product comprising:
one or more computer readable storage media and program instructions stored on the one or more computer readable storage media, the program instructions comprising:

program instructions to, receive, by one or more computer processors, code-coverage history and system runtime history from a server connected by a network;

program instructions to, receive, by the one or more computer processors, code version information from the server, wherein the code version information comprises revision data affecting each line of source code and wherein the code version information is based on a collection of change sets comprising a record of revisions from a plurality of source code builds in a source code repository, created during a software build process for the plurality of source code builds and maintained as part of the development of a software product;

program instructions to, respond to receive an inspection line of code and an inspection variable, retrieving, by the one or more computer processors, runtime data semantics from the server, comprising the code-coverage history, the system runtime history and the code version information, wherein the system runtime history comprises a current variable memory address range and a historic variable memory address range retrieved from process maps created by memory mapping program variables output during runtime from the plurality of test runs of the software product, and wherein the runtime data semantics are filtered based on the inspection line of code and the inspection variable;

program instructions to, output to a debugger, by the one or more computer processors, the runtime data semantics wherein the code-coverage history displays variables affected by the inspection variable value based on a plurality of test runs of the software product and the plurality of source code builds and wherein the code version information displays the record of revisions from the plurality of source code builds based on the inspection line of code and an inspection variable; and program instructions to, identify and resolve, by the debugger, logic problems in the source code using the runtime data semantics.

8. The computer program product of claim 7, wherein receive the inspection line of code and the inspection variable comprises at least one of a mouse pointer hover and input device interaction in a debugger session.

9. The computer program product of claim 7, wherein the code-coverage history comprises a current value and historic code-coverage data based on output from the plurality of test runs of the software product.

10. The computer program product of claim 7, wherein the code version information comprises at a current version and a history of code version information received from a collection of change sets, based on the plurality of source code builds.

11. The computer program product of claim 7, wherein the code-coverage history further comprises output from the plurality of test runs of the software product and a predetermined scope of data collection.

12. The computer program product of claim 7, further comprising:
program instructions to, filter, by the one or more computer processors, the runtime data semantics output based on an output range limit associated with each of the code-coverage history, the system runtime history and the code version information.

13. A computer system for collection and presentation of runtime data semantics in a Software Test Environment, the computer system comprising:
  one or more computer processors;
  one or more computer readable storage media;
  program instructions stored on the one or more computer readable storage media for execution by at least one of the one or more computer processors, the program instructions comprising:
    program instructions to, receive, by the one or more computer processors, code-coverage history and system runtime history from a server connected by a network;
    program instructions to, receive, by the one or more computer processors, code version information from the server, wherein the code version information comprises revision data affecting each line of source code and wherein the code version information is based on a collection of change sets comprising a record of revisions from a plurality of source code builds in a source code repository, created during a software build process for the plurality of source code builds and maintained as part of the development of a software product;
    program instructions to, respond to receive an inspection line of code and an inspection variable, retrieving, by the one or more computer processors, runtime data semantics from the server, comprising the code-coverage history, the system runtime history and the code version information, wherein the system runtime history comprises a current variable memory address range and a historic variable memory address range retrieved from process maps created by memory mapping program variables output during runtime from the plurality of test runs of the software product, and wherein the runtime data semantics are filtered based on the inspection line of code and the inspection variable;
    program instructions to, output to a debugger, by the one or more computer processors, the runtime data semantics wherein the code-coverage history displays variables affected by the inspection variable value based on a plurality of test runs of the software product and the plurality of source code builds and wherein the code version information displays the record of revisions from the plurality of source code builds based on the inspection line of code and an inspection variable; and
  program instructions to, identify and resolve, by the debugger, logic problems in the source code using the runtime data semantics.

14. The computer system of claim 13, wherein receive the inspection line of code and the inspection variable comprises at least one of a mouse pointer hover and input device interaction in a debugger session.

15. The computer system of claim 13, wherein the code-coverage history comprises a current value and historic code-coverage data based on output from the plurality of test runs of the software product.

16. The computer system of claim 13, wherein the code version information comprises a current version and a history of code version information received from a collection of change sets, based on the plurality of source code builds.

17. The computer system of claim 13, wherein the code-coverage history further comprises output from the plurality of test runs of the software product and a predetermined scope of data collection.

* * * * *